US011522695B2

United States Patent
Hariharan et al.

(10) Patent No.: US 11,522,695 B2
(45) Date of Patent: Dec. 6, 2022

(54) SHARING SYSTEM ACCESS USING A MOBILE DEVICE

(71) Applicant: Apple Inc., Cupertino, CA (US)

(72) Inventors: Sriram Hariharan, San Jose, CA (US); Yannick L. Sierra, San Francisco, CA (US); Frederic Jacobs, Lausanne (CH)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 16/982,513

(22) PCT Filed: Mar. 19, 2019

(86) PCT No.: PCT/US2019/022975
§ 371 (c)(1),
(2) Date: Sep. 18, 2020

(87) PCT Pub. No.: WO2019/183097
PCT Pub. Date: Sep. 26, 2019

(65) Prior Publication Data
US 2021/0028928 A1 Jan. 28, 2021

Related U.S. Application Data

(60) Provisional application No. 62/645,261, filed on Mar. 20, 2018.

(51) Int. Cl.
*H04L 9/32* (2006.01)
*H04L 9/08* (2006.01)
*H04L 9/40* (2022.01)

(52) U.S. Cl.
CPC .......... *H04L 9/088* (2013.01); *H04L 63/0861* (2013.01); *H04L 63/10* (2013.01)

(58) Field of Classification Search
CPC ...... H04L 9/088; H04L 63/0681; H04L 63/10
See application file for complete search history.

(56) References Cited

U.S. PATENT DOCUMENTS 6,041,410 A * 3/2000 Hsu .................. G07C 9/257
713/186
8,775,757 B2 7/2014 Polzin et al.
(Continued)

OTHER PUBLICATIONS

Texas Instruments, Bluetooth® low energy Beacons, Application Report; SWRA475A—Jan. 2015—Revised Oct. 2016, 15 pages.
(Continued)

*Primary Examiner* — Phy Anh T Vu
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to using a device to gain access to another system. In some embodiments, a first mobile device performs a pairing operation with a control unit that controls access to a system, the pairing operation including the first mobile device establishing a first cryptographic key with the control unit. The first mobile device receives a request to enable a second mobile device to communicate with the control unit, and in response to receiving the request, the first mobile device generates a second cryptographic key from the first cryptographic key. The first mobile device provides the second cryptographic key to the second mobile device. The second mobile device is configured to send a beacon including a payload encrypted with the second cryptographic key, and the encrypted payload is usable to authenticate the second mobile device to the control unit.

18 Claims, 7 Drawing Sheets

(56) References Cited

U.S. PATENT DOCUMENTS

| | | |
|---|---|---|
| 8,832,465 B2 | 9/2014 | Gulati et al. |
| 9,547,778 B1 | 1/2017 | Paaske et al. |
| 2014/0040621 A1 | 2/2014 | Klimke |
| 2014/0105396 A1* | 4/2014 | Engelien-Lopes .... H04W 12/50 380/270 |
| 2015/0147974 A1 | 5/2015 | Tucker et al. |
| 2017/0041868 A1 | 2/2017 | Palin et al. |
| 2018/0198752 A1* | 7/2018 | Zhang ................... H04W 12/03 |
| 2021/0250355 A1* | 8/2021 | Galdo .................... B60R 25/24 |
| 2021/0400492 A1* | 12/2021 | Movva .................. H04W 76/18 |

OTHER PUBLICATIONS

International Search Report in Appl. No. PCT/US2019/022975 dated Sep. 25, 2019, 6 pages.
International Preliminary Report in Appl. No. PCT/US2019/022975 dated Sep. 22, 2020, 12 pages.

* cited by examiner

SHARING SYSTEM ACCESS USING A MOBILE DEVICE

BACKGROUND

Technical Field

This disclosure relates generally to electronic security, and, more specifically, to cryptographic techniques for using a mobile device to gain access to another system.

Description of the Related Art

Traditional techniques for gaining access to functionality of a system (e.g., physical access or accessing some function of the system) may require use of physical keys or electronic device. For example, a person attempting to enter a building may present a radio-frequency identification (RFID) key fob to a reader in order to authenticate the user. Responsive to a successful authentication, the reader may communicate with a locking mechanism in order to disengage a lock protecting access to a door of the building. Carrying a traditional key or some other device may be inconvenient and may allow malicious entities to gain access if a key is lost or stolen.

Figure 1A:
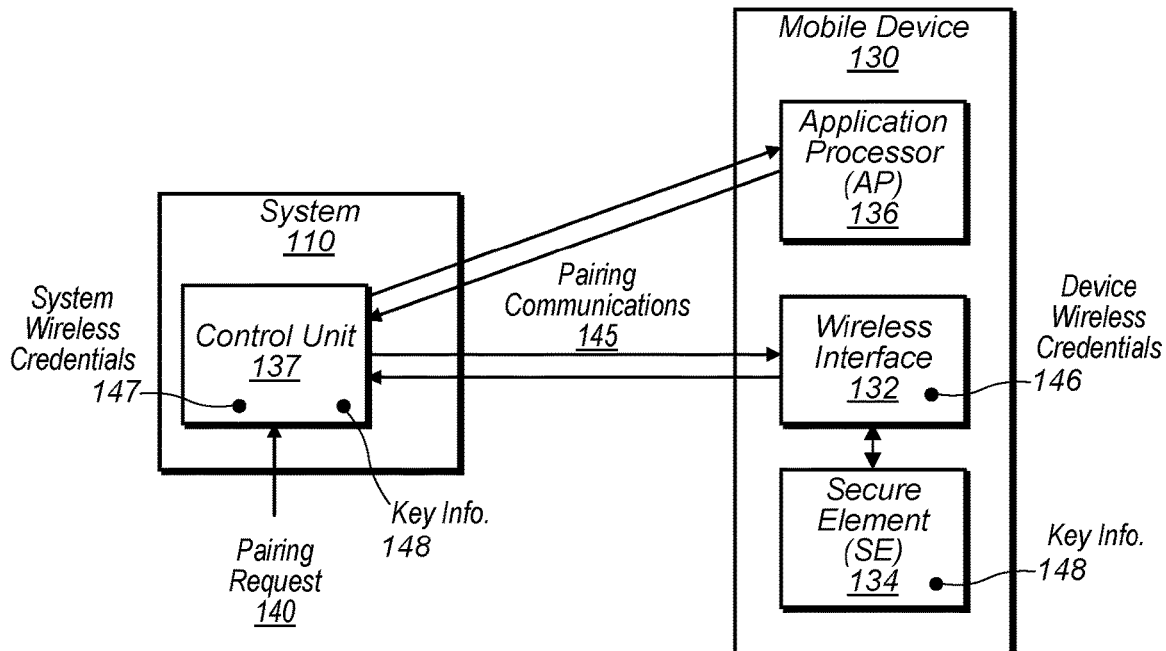
FIG. 1A is a block diagram illustrating exemplary pairing communications between a mobile device and a control unit, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform an authentication" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first user and a second user. The term "first" is not limited to the initial user of the device. The term "first" may also be used when only one user of the mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes embodiments in which a mobile device is used to gain access to functionality of a system. In some embodiments, asymmetric cryptography is used to establish a secure channel between a mobile device and a system. (As used herein, the term "secure channel" refers to either a dedicated path for communicating data (i.e., a path shared by only the intended participants) or communicating encrypted data or signed data using cryptographic keys known only to the intended participants.) Using the secure channel, the system may authenticate the device by verifying, for example, a signature generated by a secure circuit of the mobile device using a previously-stored key (e.g., a key stored as part of a pairing process). A processor such as a control unit of the system may be configured to store long-term key pairs, generate short-lived asymmetric key pairs, and verify signatures. The processor may also enable functionality of the system after successfully authenticating the mobile device.

In various embodiments, the mobile device initially performs a pairing procedure with the system. In some embodiments, this procedure may include exchanging and storing wireless credential information used to establish subsequent communications between devices such as communication addresses and identity resolving keys (IRKs). This procedure may also include the mobile device exchanging key information, which may be performed, for example, using Diffie Hellman (DH)). This exchange and storage of key information may be facilitated using secure circuit such as a secure element (SE). As used herein, the term "secure element" is to be interpreted according to its understood meaning in the art, which includes circuitry (e.g., often a single-chip microcontroller) that is configured to store information in a tamper-resistant manner that resists unauthorized extraction of that information. Non-limiting examples of form factors for secure elements include UICC and embedded SE. In some embodiments, the secure element is also used for other types of transactions such as payment transactions, for example. For payment transactions, the secure element may cryptographically store data for payment instruments (e.g., credit cards) and owners (e.g., cardholders), entry to physical locations or buildings, transmit access, etc.

Once the mobile device has been paired with the other system, the mobile device may perform an exchange with the other system to enable functionality of the other system such as, in some embodiments, opening a door, starting an engine or activating a motor, making a call, playing media, traveling above a certain speed, etc. In some embodiments, the exchange includes the mobile device generating another encryption key shared with the system for the session and the system issuing a challenge to the mobile device. In response to receiving the challenge, the secure element of the mobile device generates a response using a private key of the previously generated public key pair. (In other embodiments, other secure circuits that are not considered secure elements may be used for perform similar functionality.) The mobile device then encrypts the response with the other encryption key and sends the response to the system for verification. In response to a successful verification, the system may enable requested functionality.

In some instances, an authorized user having a first mobile device may wish to enable another user having a second mobile device to access the system. If the first mobile device has already performed a pairing operation with the system, in some embodiments, the authorized user can instruct the first mobile device to perform an access sharing process with the second mobile device to enable the second mobile device to communicate with the system. As will be described in greater detail below with respect to FIGS. 1C and 3-5C, this process may include the first mobile device providing, to the second mobile device, the system's wireless credentials obtained during the earlier pairing between the first mobile device and the system. In some embodiments, if the first mobile device is able to communicate with the system, the first mobile device may also communicate wireless credentials of the second mobile device to the system in order to attest to the second mobile device being authorized to interface with the system. In some embodiments, if the first mobile device is unable to communicate with the system, the first mobile device (e.g., via the secure element) may generate key information for the second mobile device based on key information exchanged during the earlier pairing operation between the first mobile device and the system. Based on this provided information, the second mobile device may be able to interface with the system in order to allow the other user to obtain access to the system—or to perform further pairing operations in order to obtain to eventually obtain access. In various embodiments, sharing information with the second device as described herein may enable the second device to begin interfacing with the system without having to perform the same pairing operation performed by the first mobile device. For example, the other user may be able to approach the system and send a request to via the second mobile device to access the system without being prompted beforehand by the second mobile device to pair the second mobile device with the system.

In other embodiments, other techniques may be used to share access. For example, a secure element of the other user's mobile device may generate a public key pair and a corresponding certificate signing request for the public key. The other user's device may then send the certificate signing request to the secure element of the owner's mobile device, which generates a certificate for public key. The owner's mobile device may then send the generated certificate to the other user's mobile device to permit that mobile device to enable functionality of the system.

Turning now to FIG. 1A, a block diagram of an exemplary pairing communications 145 between circuitry such as a control unit 137 of a system 110 and a mobile device 130 is depicted. Although a single control unit 137 is discussed in various examples for purposes of illustration, similar techniques may be used with multiple different control units 137 or processors (e.g., microcontrollers).

System 110, in the illustrated embodiment, includes control unit 137 configured to control functionality of system 110. In some embodiments, system 110 is a vehicle (or a to component of a vehicle), and control unit is an electronic control unit (ECU). As used herein, the term "ECU" is a term of art which is intended to be construed according to its well-understood meaning, which includes circuitry configured to control one or more operations of a vehicle. Examples of vehicles include, without limitations: aircraft, marine vessels, RVs, automobiles, buses, railed vehicles, spacecraft, robotic devices, etc. Examples of systems that may not be vehicles further include: physical locations such as buildings, transit access control, and internet of things or home automation devices or controllers.

Mobile device 130, in the illustrated embodiment, includes an application processor (AP) 136 and wireless interface 132, which in turn includes (or is associated with) an SE 134. In some embodiments, SE 134 is configured to perform various encryption operations to facilitate secure communications between mobile device 130 and system 110. Wireless interface 132 may support any suitable form of wireless communications. For example, in some embodiments, interface 132 is a near field communication (NFC) interface, Bluetooth interface, Wi-Fi interface, cellular interface, etc. Although described as a mobile device 130, this device 130 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA).

System 110 and mobile device 130 may initiate performance of a pairing operation in response to receiving a pairing request 140, which may be received by control unit 137 and/or mobile device 130. In some embodiments, this request 140 may be initiated at system 110 via input entered using, for example, a touchscreen in system 110 and may include information identifying the user and/or information for initial authentication of the user such as a personal identification number (PIN), a password, biometric authentication, etc. In various embodiments, the information may be sent out of band relative to the wireless communications between system 110 and 130. In some embodiments, a manufacturer or provider of the system provides an initial PIN to the user upon sale of the system 110, which is then used in pairing request 140.

In some embodiments, control unit 137 and wireless interface 132 support wireless protocol (e.g., Bluetooth) that uses changing wireless communication addresses in order to hide the identities of control unit 137 and interface 132 from someone monitoring communications between control unit 137 and interface 132. In such an embodiment, a given participant (e.g., control unit 137 or interface 132) may provide a base address along with information indicating how to resolve the address to the base address. For example, in some embodiments, this information may include a public media access control (MAC) address and identity resolving key (IRK). In response to receiving this information, the recipient can resolve the changing address from this information and connect to a participant with the changed address. Accordingly, in the illustrated embodiment, pairing communications 145 include mobile device 130 sending its wireless credentials 146 (e.g., its public MAC address and IRK) to control unit 137 and control unit 137 sending its system wireless credentials 147 (e.g., its public MAC address and IRK) to mobile device 130. Subsequent communications may then be addressed to their respective changing addresses. To someone monitoring these communications, however, the changing addresses may appear to be several different devices communicating with one another.

In various embodiments, pairing communications 145 further include exchanging key information 148. As noted above, in some embodiments, this may include exchanging public keys in order to establish a shared secret (e.g., a shared key and/or link key discussed below) and mobile device 130 storing the secret in the SE 134. In other embodiments, other approaches may be used to establish a shared secret. In some embodiments, additional information may be exchanged such as described in International Appl. No. PCT/US18/20494 filed Mar. 1, 2018, which is incorporated by reference herein in its entirety. This exchanged key information 148 may then be used for authentication, encryption, and/or deriving additional key information as discussed below. Once paired, SE 134 may also facilitate transactions in which the mobile device 130 instructs the system 110 to perform various operations.

Figure 1B:
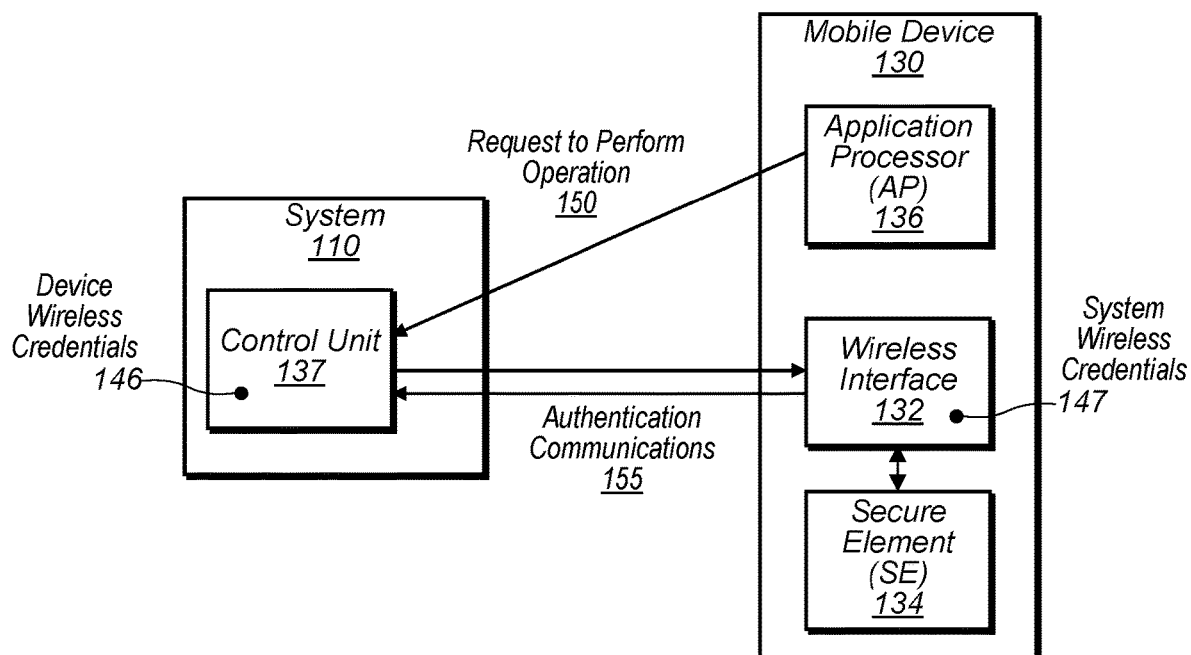
FIG. 1B is a block diagram illustrating exemplary request and authentication communications between a mobile device and a control unit, according to some embodiments.

Turning now to FIG. 1B, a block diagram of exemplary communications between a system and a mobile device to perform an operation is depicted. Examples of an operation include opening a door lock, starting an engine, enabling or disabling functionality, changing media being played, connecting or disconnecting the system to a wide-area network, authorizing or removing additional users, access to keychain data, ability to make purchases, etc. In the illustrated embodiment, mobile device 130 and system 110 exchange communications using the earlier exchanged wireless credentials 146 and 147. As shown, these communications may include a request 150 to perform an operation (e.g., unlocking a system 110) along with one or more authentication communications 155. In some embodiments, request 150 and communications 155 may be performed in a manner described in greater detail in the '494 application incorporated by reference above.

Figure 1C:
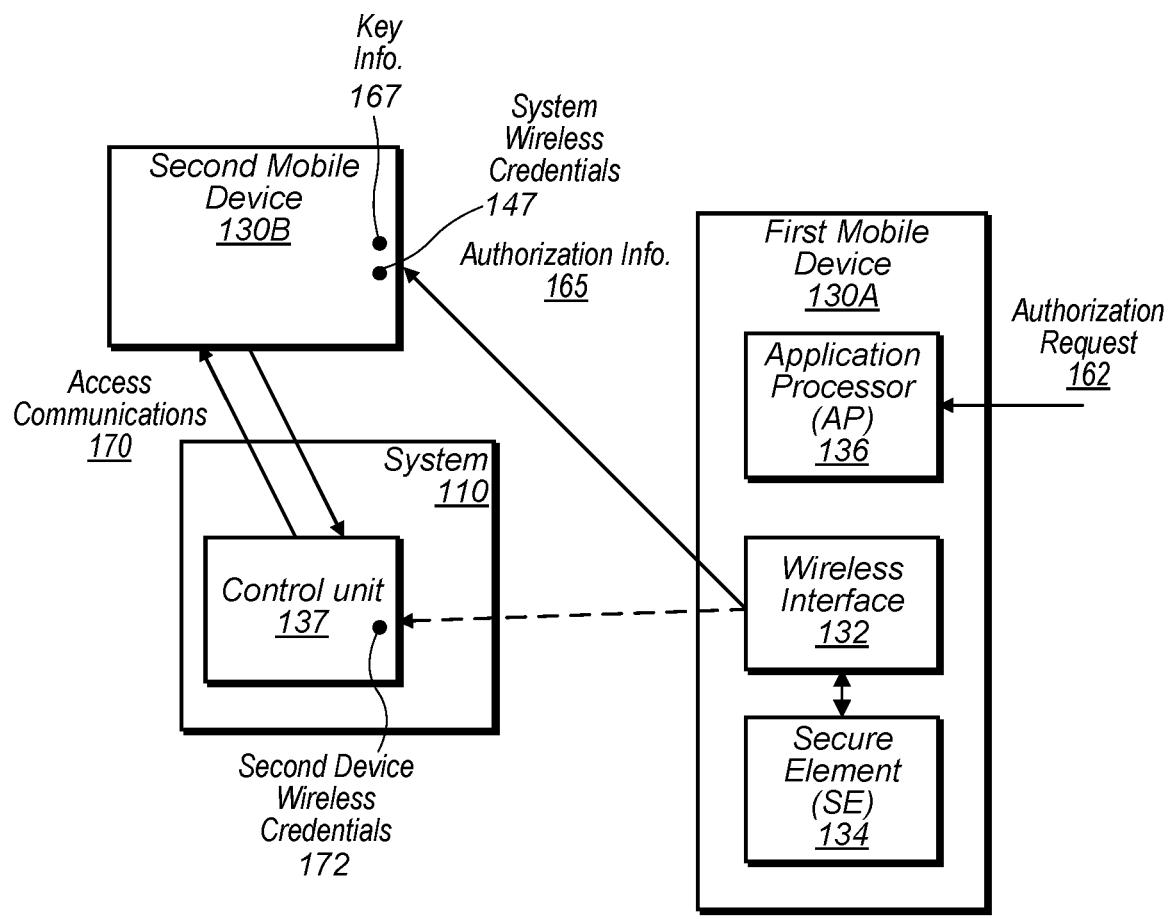
FIG. 1C is a block diagram illustrating exemplary communications to grant authorization to another mobile device to control a control unit, according to some embodiments.

Turning now to FIG. 1C, a block diagram of exemplary communications to grant authorization to another mobile device 130B to interface with control unit 137 is depicted. As shown, the first mobile device 130A may initially receive an authorization request 162 to authorize another device 130B to interface with system 110 (and more specifically with control unit 137). In some embodiments, in response to receiving this request, mobile device 130A may authenticate the user making the request (e.g., via a biometric sensor such as the one discussed below with respect to FIG. 2) before proceeding forward. If the authentication is successful, mobile device 130A may provide the corresponding authorization information 165 to enable the second mobile device 130B to exchange access communications 170 with control unit 137.

In some embodiments, if the first mobile device 130A is able to communicate with system 110, an "online" sharing process may be performed in which authorization information 165 includes the first mobile device communicating system wireless credentials 147 to device 130B and wireless credentials 172 of second mobile device 130B to control unit 137. In such an exchange, control unit 137 is able to determine that subsequent communications 170 are from an authorized device based on these credentials 172. An example of an online sharing exchange is described below in greater detail with respect to FIG. 3.

In some embodiments, if the first mobile device 130A is unable to communicate with system 110, an "offline" sharing process may be performed in which the first mobile device communicates system wireless credentials 147 to device 130B. To further authenticate device 130B, the first mobile device uses the previously stored key information 148 in SE 134 from the previous pairing to derive key information 167 for second mobile device 130B. In some embodiments, because control unit 137 is also in possession of this information, control unit 137 is also able derive key information 167 and can authenticate access communications 170 based on this shared key information 167. An example of an offline sharing exchange is described below in greater detail with respect to FIG. 4.

Figure 2:
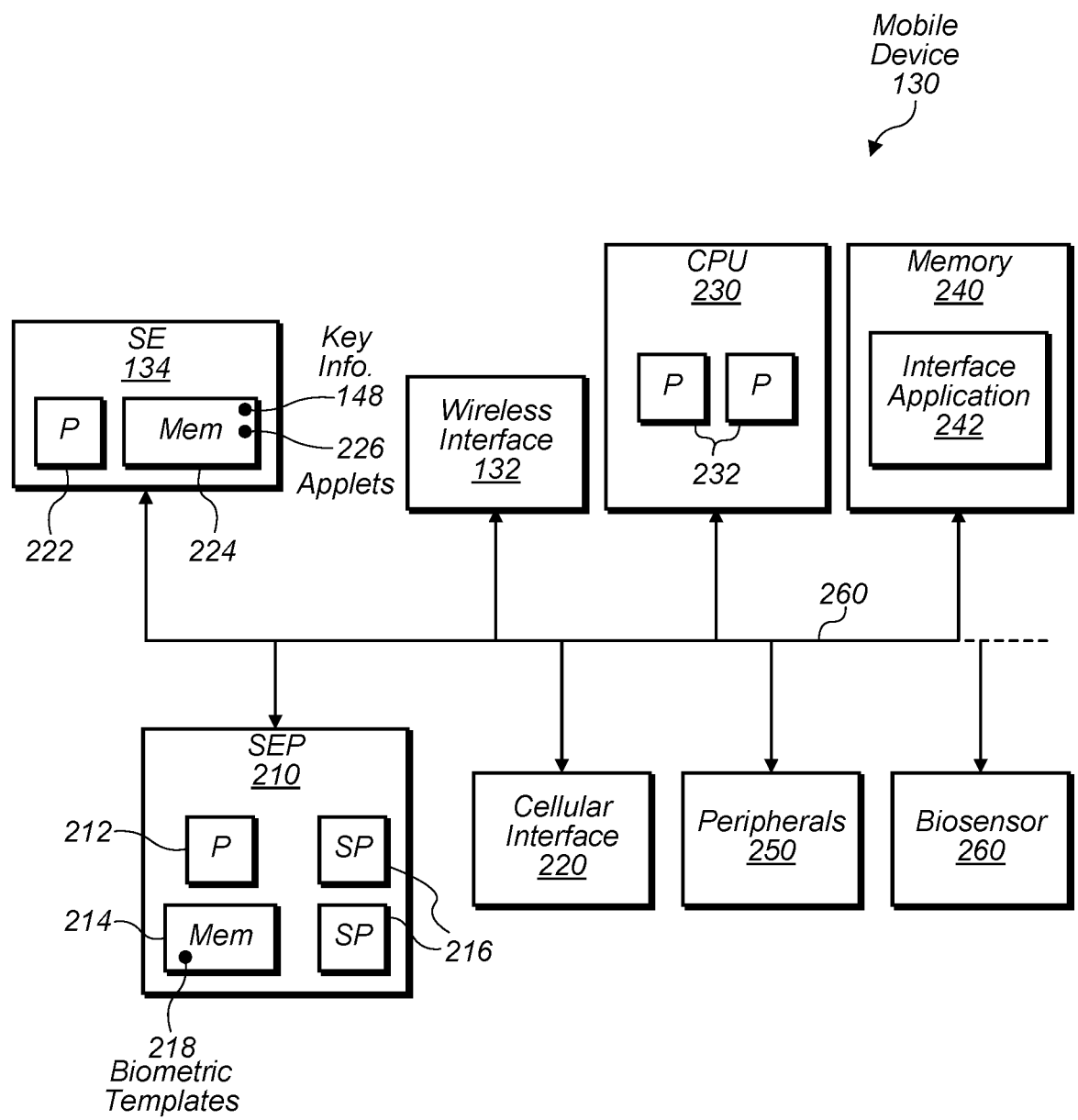
FIG. 2 is a block diagram illustrating an exemplary mobile device, according to some embodiments.

Turning now to FIG. 2, a block diagram of a mobile device 130 is depicted. In the illustrated embodiment, mobile device 130 may include wireless interface 132 and SE 134. In some embodiments, mobile device 130 further includes a secure enclave processor (SEP) 210, cellular interface 220, CPU 230, memory 240, peripherals 250, and biosensor 260 coupled via a communication fabric 270. As shown, SEP 210 may include one or more processors P 212, a secure memory 214, and one or more security peripherals 216. SE 134 may include one or more processors P 222 and a memory 224. CPU 230 may include one or more processors P 232. Memory 240 may store an interface application 242. In some embodiments, mobile device 130 may be implemented differently than shown.

In some embodiments, SEP 210 is configured to maintain previously-captured biometric template data 218 of one or more authorized users and compare it against newly received data captured by biosensor 260 in order to authenticate a user. (In another embodiment, biosensor 260 or SE 134 may perform the comparison.) In the illustrated embodiment, SEP 210 is configured to store biometric data collected from fingerprints, facial biometric data (e.g., iris data, voice data, facial or body characteristics), etc. in biometric templates 218. In fingerprint embodiments, each template 218 may correspond to a particular registered user and may be assigned a unique index value. In some embodiments, if biometric data received from biosensor 260 matches the biometric data stored in a template 218, SEP 210 is configured to provide the unique index value associated with the matching template 218 to SE 134, which, in turn, uses the index value to look up the corresponding identification information for a known user being authenticated. In some embodiments, SEP 210 may store multiple templates 218. In various embodiments, communications between SEP 210, SE 134, and/or biosensor 260 are encrypted such that another entity, such as CPU 230, is unable to view their communications.

In various embodiments, SEP 210 is configured to securely store biometric data. Accordingly, in various embodiments, SEP 210 is isolated from the rest of the mobile device 130 except for a carefully controlled interface (thus forming a secure enclave for SEP processor 212, secure memory 214, and security peripherals 216). Because the interface to SEP 210 is carefully controlled, direct access to SEP processor 212, secure memory 214, and security peripherals 216 may be prevented. In one embodiment, a secure mailbox mechanism may be implemented. In the secure mailbox mechanism, external devices may transmit messages to an inbox. SEP processor 212 may read and interpret the message, determining the actions to take in response to the message. Response messages from the SEP processor 212 may be transmitted through an outbox, which is also part of the secure mailbox mechanism. Other circuitry may not be able to access internal resources of SEP 210 other than via the mailbox mechanism. Other interfaces that permit only the passing of commands/requests from the external components and results to the external components may be used. No other access from the external devices to SEP 210 may be permitted, and thus the SEP 210 may be "protected from access." More particularly, software executed anywhere outside SEP 210 may be prevented from direct access to the secure components with the SEP 210. SEP processor 212 may determine whether a command is to be performed. In some cases, the determination of whether or not to perform the command may be affected by the source of the command. That is, a command may be permitted from one source but not from another.

In various embodiments, SEP 210 may be configured to perform functionality described with reference to SE 134 and/or vice versa. In some embodiments, SE 134 is configured to authenticate the identity of device 130 while SEP 210 is configured to authenticate the identity of a current user of device 130 (which also may be required for system access, in some embodiments).

In some embodiments, SEP processor 212 may execute securely loaded software that facilitates implementing functionality descried with respect to SEP 210. For example, a secure memory 214 may include software executable by SEP processor 212. One or more of the security peripherals 216 may have an external interface, which may be connected to a source of software (e.g. a non-volatile memory such as Flash memory). In another embodiment, the source of software may be a non-volatile memory coupled to another peripheral 216, and the software may be encrypted to avoid observation by a third party. The software from the source may be authenticated or otherwise verified as secure, and may be executable by SEP processor 212. In some embodiments, software may be loaded into a trust zone in memory 214 that is assigned to the SEP 210, and SEP processor 212 may fetch the software from the trust zone for execution. The software may be stored in the memory 240 in encrypted form to avoid observation. Despite the steps taken to ensure security of the secure software, the secure software may still be prevented from directly accessing/obtaining stored private keys. Only hardware may have access to private keys, in an embodiment.

Security peripherals 216 may be hardware configured to assist in the secure services performed by SEP 210. Accordingly, security peripherals 216 may include authentication hardware implementing/accelerating various authentication algorithms, encryption hardware configured to perform/accelerate encryption, secure interface controllers configured to communicate over a secure interface to an external (to mobile device 130) device, etc.

In some embodiments, SE 134 may implement similar functionality as SEP 210 in order to restrict access to confidential information stored in memory 224 such as public-key information 228. For example, SE 134 may implement a mailbox to restrict access to processor 222 and memory 224. In various embodiments, SE processor 222 also executes securely loaded software in order to implement functionality described herein such as applets 226 stored in memory 224.

Applets 226, in one embodiment, are executable to perform enrollment of mobile device 130 and authentication with a reader. With respect to enrollment, applets 226 may be executable to generate public-key pairs and obtain corresponding certificates, which may be stored in memory 224 as public-key information 228.

Interface application 242, in some embodiments, is executable to facilitate interfacing between SEP 210, SE 134, and a user of mobile device 130 when pairing and authentication are performed. Accordingly, application 242 may provide various prompts to the user instructing the user to perform various actions during these processes. Application 242 may also activate biosensor 260, SEP 210, and/or SE 134 when appropriate during these processes. Various actions performed by application 242 are described in further detail below.

Cellular Interface 220, in some embodiments, is a long-range radio configured to facilitate interaction between mobile device 130 and one or more external systems such as systems 120 and 140. Cellular link 220 may include suitable circuitry for interfacing with long-range networks such as a baseband processor, analog RF signal processing circuitry (e.g., including filters, mixers, oscillators, amplifiers, etc.), digital processing circuitry (e.g., for digital modulation as well as other digital processing), one or more antennas, etc. Cellular interface 220 may be configured to communicate using any of multiple radio access technologies/wireless communication protocols such as GSM, UMTS, CDMA2000, LTE, LTE-A, etc.

As mentioned above, CPU 230 may include one or more processors 232. Generally, a processor may include circuitry configured to execute instructions defined in an instruction set architecture implemented by the processor. Processors 232 may include (or correspond to) processor cores implemented on an integrated circuit with other components as a system on a chip (SOC) or other levels of integration. Processors 232 may further include discrete microprocessors, processor cores and/or microprocessors integrated into multichip module implementations, processors implemented as multiple integrated circuits, etc.

Processors 232 may execute the main control software of the system, such as an operating system. Generally, software executed by CPU 230 during use may control the other components of the system to realize the desired functionality of the system. The processors may also execute other software. These applications may provide user functionality, and may rely on the operating system for lower-level device control, scheduling, memory management, etc. Accordingly, processors 232 (or CPU 230) may also be referred to as application processors. CPU 230 may further include other hardware such as an L2 cache and/or an interface to the other components of the system (e.g. an interface to the communication fabric 270).

Memory 240 may generally include the circuitry for storing data. For example, memory 240 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). Device 130 may include a memory controller (not shown) that may include queues for memory operations, for ordering (and potentially reordering) the operations and presenting the operations to the memory 240. The memory controller may further include data buffers to store write data awaiting write to memory and read data awaiting return to the source of the memory operation. In some embodiments, the memory controller may include a memory cache to store recently accessed memory data. In some embodiments memory 330 may include program instructions, such as instructions of application 242 that are executable by one or more processors 232 to cause device 130 to perform various functionality described herein with respect to device 130.

Peripherals 250 may be any set of additional hardware functionality included in device 130. For example, peripherals 250 may include video peripherals such as an image signal processor configured to process image capture data from a camera or other image sensor, display controllers configured to display video data on one or more display devices, graphics processing units (GPUs), video encoder/decoders, scalers, rotators, blenders, etc. Peripherals 250 may include audio peripherals such as microphones, speakers, interfaces to microphones and speakers, audio processors, digital signal processors, mixers, etc. Peripherals 250 may include interface controllers for various interfaces including interfaces such as Universal Serial Bus (USB), peripheral component interconnect (PCI) including PCI Express (PCIe), serial and parallel ports, etc. Peripherals 250 may include networking peripherals such as media access controllers (MACs). Any set of hardware may be included.

Communication fabric 270 may be any communication interconnect and protocol for communicating among the components of device 130. Communication fabric 270 may be bus-based, including shared bus configurations, cross bar configurations, and hierarchical buses with bridges. Communication fabric 270 may also be packet-based, and may be hierarchical with bridges, cross bar, point-to-point, or other interconnects.

Although FIG. 2 depicts components within mobile device 130, it is noted that similar components may exist in computer systems used to implement other functionality described herein such as functionality described with respect to system 110 or control unit 137. Accordingly, these systems may also include CPUs, memory, various network interfaces, and peripherals such as those described above.

Figure 3:
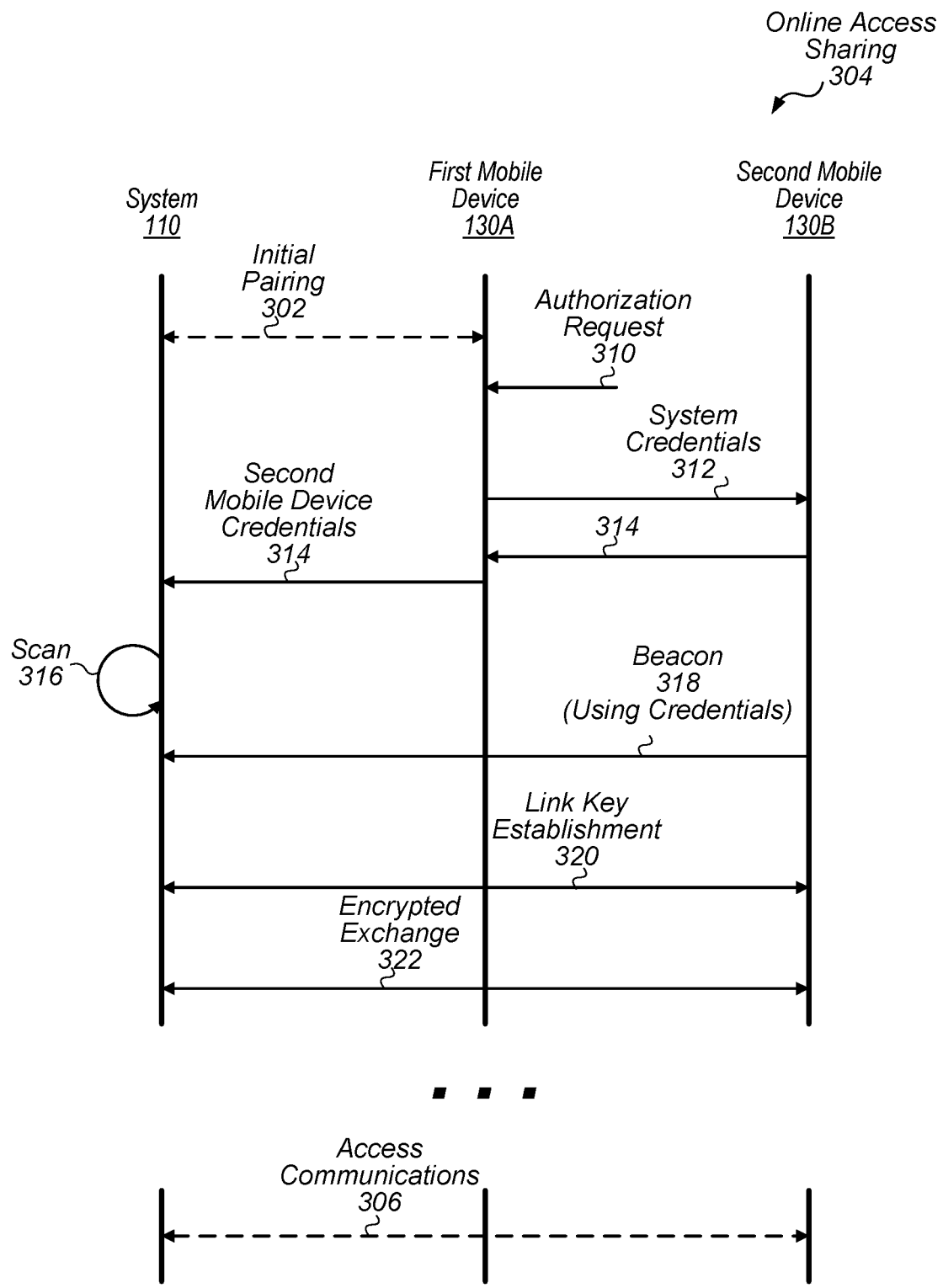
FIG. 3 is a communication diagram illustrating an exemplary process for granting authorization to control a control unit when the control unit is accessible to a mobile device.

Turning now to FIG. 3, an exemplary communication diagram of an online access sharing exchange 304 is depicted. As noted above, exchange 304 may be performed after an initial pairing 302 between system 110 and first mobile device 130A and when first mobile device 130A is able to communicate with system 110.

As shown, online access sharing 304 may begin at 310 with an authorization request 162 being received at mobile device 130A. In response to receiving this request, first mobile device 130A may provide system credentials 147 to second mobile device 130B at 312 and convey second device credentials 172 at 314 to system 110. In various embodiments, credentials 172 may include a temporary IRK, which is replaced with another IRK later in exchange 304 such as during or after encrypted exchange 322 discussed below. In some instances, a new IRK may be used in order to prevent mobile device 130A from tracking mobile device 130B by determining the changing address as mobile device 130A learns the IRK communicated through the exchange at 314. In some embodiments, the credentials may also include key information 167 in order to further authenticate second mobile device 130B as will be discussed below with respect to FIG. 4. Based on these exchanged credentials 147 and 172, system 110 and second mobile device 130B may derive each other's respective changing communication addresses for subsequent use during access communications 306.

Meanwhile, at 316, system 110 may be scanning for incoming beacons. At 318, second mobile device 130B sends a beacon, which, in various embodiments, may advertise various functionality of device 130B such as device 130B's ability to interface with system 110 in order to facilitate performance of various actions such as those noted above with FIG. 1B. In some embodiments, the beacon is a frame compliant with a Bluetooth® Low Energy (LE) (BLE) beacon. System 110 may then be able to authenticate the beacon by determining whether the source address identified in the beacon corresponds to the changing address of the second mobile device 130B.

After receiving the beacon and determining it is valid, system 110 may proceed at 320 to establish a link key with mobile device 130B. As noted above, this may include performing, for example, a DH exchange. In other embodiments, however, other key exchange algorithms may be used. Once the link key has been established, an encrypted exchange 322 may be performed in which additional configuration information is exchanged. In some embodiments, exchange 322 may include encrypting the traffic with the link key or deriving a temporary key from the link key to encrypt traffic.

After exchange 304 has completed, mobile device 130B may exchange various access communications 170 at 306 with system 110 using the earlier exchanged credentials and established link key.

Figure 4:
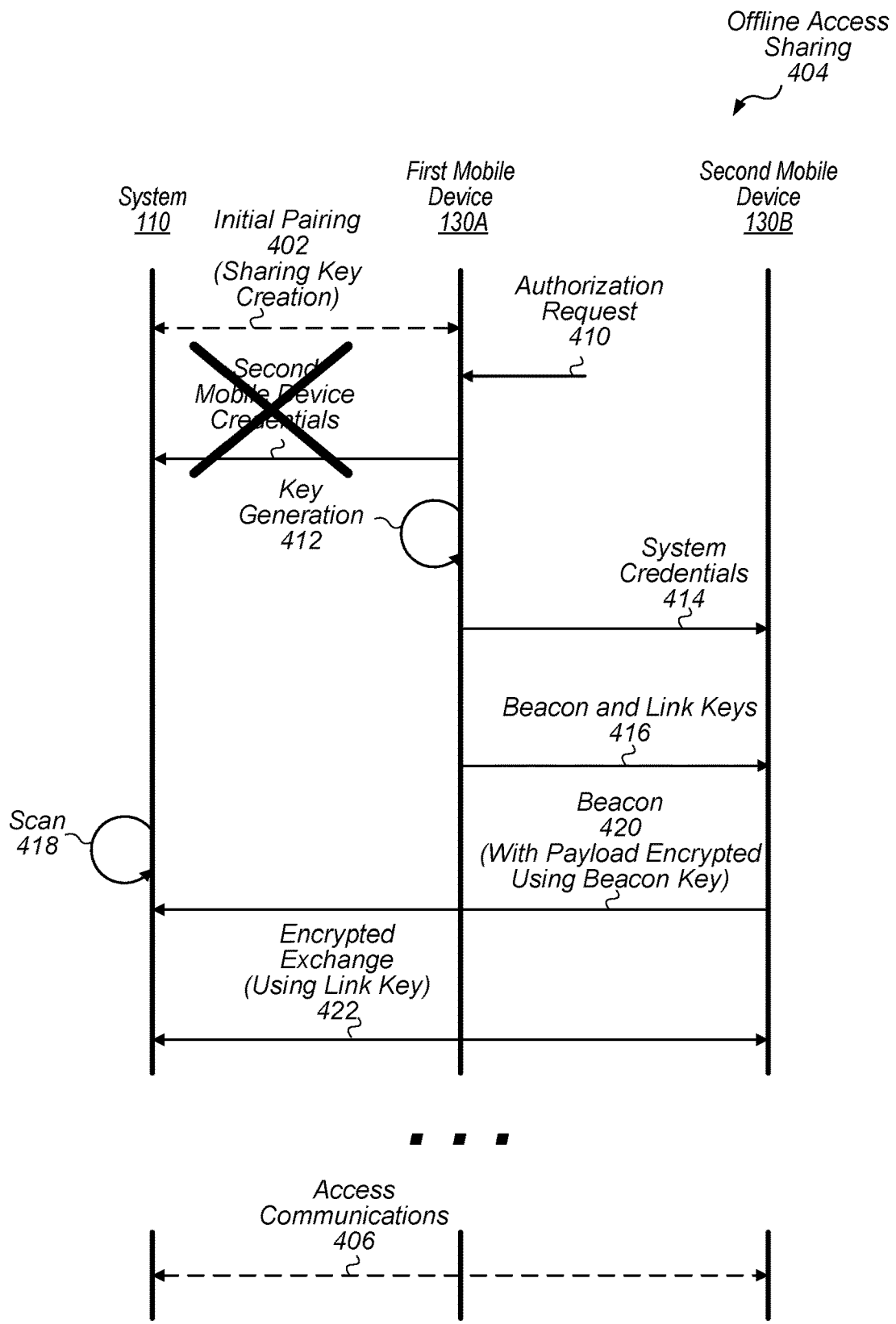
FIG. 4 is a communication diagram illustrating another exemplary processes for granting authorization to control a control unit when the control unit is inaccessible to a mobile device.

Turning now to FIG. 4, an exemplary communication diagram of an offline access sharing exchange 404 is depicted. As noted above, exchange 404 may be performed after an initial pairing 402 between system 110 and a first mobile device 130A and when first mobile device 130A is not able to communicate with system 110.

As shown, exchange 404 may begin with mobile device 130A receiving an authorization request 162 at 410 and sending corresponding system credentials 147 to mobile device 130B As system 110 is unable to receive second device credentials 172, credentials 172 may be sent later by mobile device 130B during 422 or later. Once mobile device 130B is in possession of system credentials 147, device 130B may then derive the changing address for system 110 for subsequent use during access communications 406.

At 414, mobile device 130A may derive key information 167 based on key information 148 established in initial pairing 402. For example, in some embodiments, this may include generating a first key (e.g., a "beacon key") for encrypting payloads of beacons and a second link key for encrypting subsequent communications. In one embodiment, the beacon key is generated by applying a key derivation function (KDF) to 1) a sharing key established during pairing 402 and 2) a counter value. In some embodiments, the sharing key established between system 110 and device 130A is established to specially facilitate sharing access to system 110. In some embodiments, mobile device 130A maintains a counter indicative of the number of other devices 130 that have received authorization information 165 from device 130A—in such an embodiment, the counter value is the value of the counter when it provides information 165 to a particular device 130. In one embodiment, the second link key is generated by applying a KDF to 1) the sharing key, 2) the previous link key established in pairing operation 402 between device 130A and system 110, and a counter value. Once the keys have been generated, mobile device 130A may provide system credentials 147 at 414 and the keys at 416 to device 130B.

At 418, system 110 may be scanning for traffic and receive a beacon at 420 having a timestamp payload encrypted using the beacon key. In response to receiving the beacon, system 110 may attempt to verify the beacon by generating the corresponding beacon key and decrypting the payload to confirm the timestamp is current (e.g., meets a threshold time value). System 110 may also derive the corresponding second link key. As both system 110 and device 130B are now in possession of the link key, in some embodiments, second mobile device 130B may proceed to perform an encrypted exchange with system 110 using the link key at 422 in response to successful verification of the beacon. In some embodiments, a new link key may be established so that first mobile device 130A is not aware of the new key. Similar to exchange 304 above, after exchange 404 has completed, mobile device 130B may be able to exchange various access communications 170 at 406 with system 110 as discussed earlier.

Figure 5A:
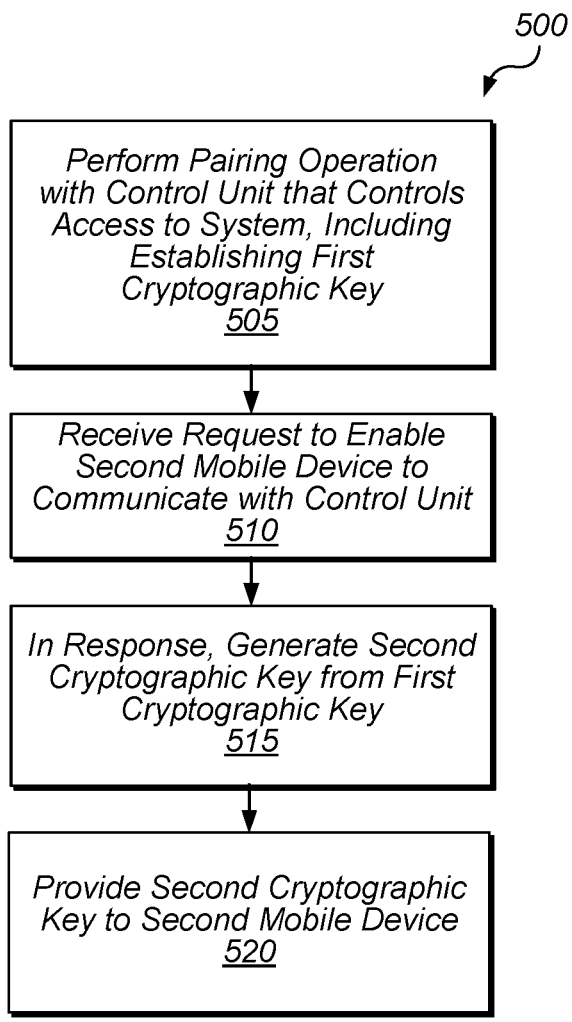
FIGS. 5A-5D are flow diagrams illustrating exemplary methods, according to some embodiments.

Turning now to FIG. 5A, a flow diagram of a method 500 for sharing access is depicted. Method 500 is one embodiment of a method performed by a first mobile device granting access to a system such as mobile device 130A.

Method 500 begins in step 505 with a first mobile device performing a pairing operation with a control unit (e.g., control unit 137) that controls access to a system. In various embodiments, the pairing operation includes the first mobile device establishing a first cryptographic key (e.g., sharing key creation at 402) with the control unit. At step 510, the first mobile device receives a request (e.g., authorization request 162) to enable a second mobile device to communicate with the control unit. At step 515, in response to receiving the request, the first mobile device generates a second cryptographic key from the first cryptographic key. At step 520, the first mobile device provides the second cryptographic key to the second mobile device. In various embodiments, the second mobile device is configured to send a beacon (e.g., a beacon at 318 or 420) including a payload encrypted with the second cryptographic, and the encrypted payload is usable to authenticate the second mobile device to the control unit.

Figure 5B:
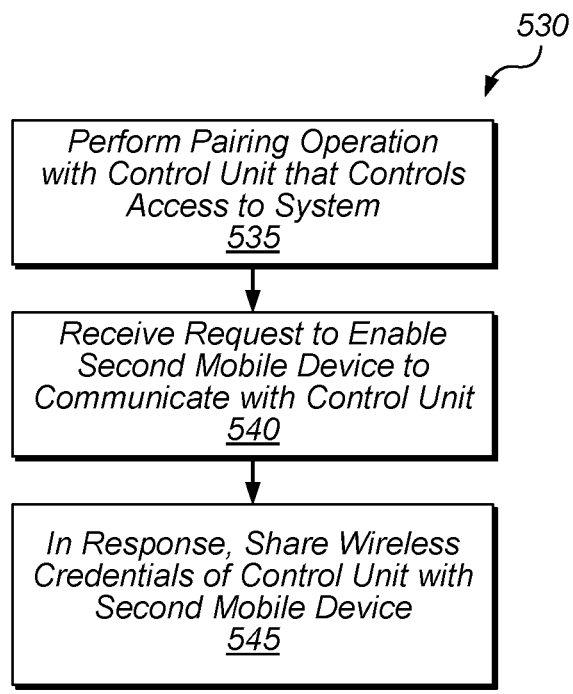

Turning now to FIG. 5B, a flow diagram of a method 530 for sharing access is depicted. Method 530 is one embodiment of a method performed by a first mobile device granting access to a system such as mobile device 130A.

Method 530 begins in step 535 with the first mobile device performing a pairing operation with a control unit (e.g., control unit 137) that controls access to a system. In various embodiments, the pairing operation includes the first mobile device receiving, from the control unit, wireless credentials (e.g., system wireless credentials 147) usable by the first mobile device to determine a changing communication address of the control unit. In step 540, the first mobile device receives a request (e.g., authorization request 162) to enable a second mobile device (e.g., second mobile device 130B) to communicate with the control unit. In step 545, in response to receiving the request, the first mobile device shares the wireless credentials of the control unit with the second mobile device, the second mobile device being configured to determine the changing communication address based on the shared wireless credentials (e.g., for use in access communications 306 or 406).

Figures 5C, 5D:
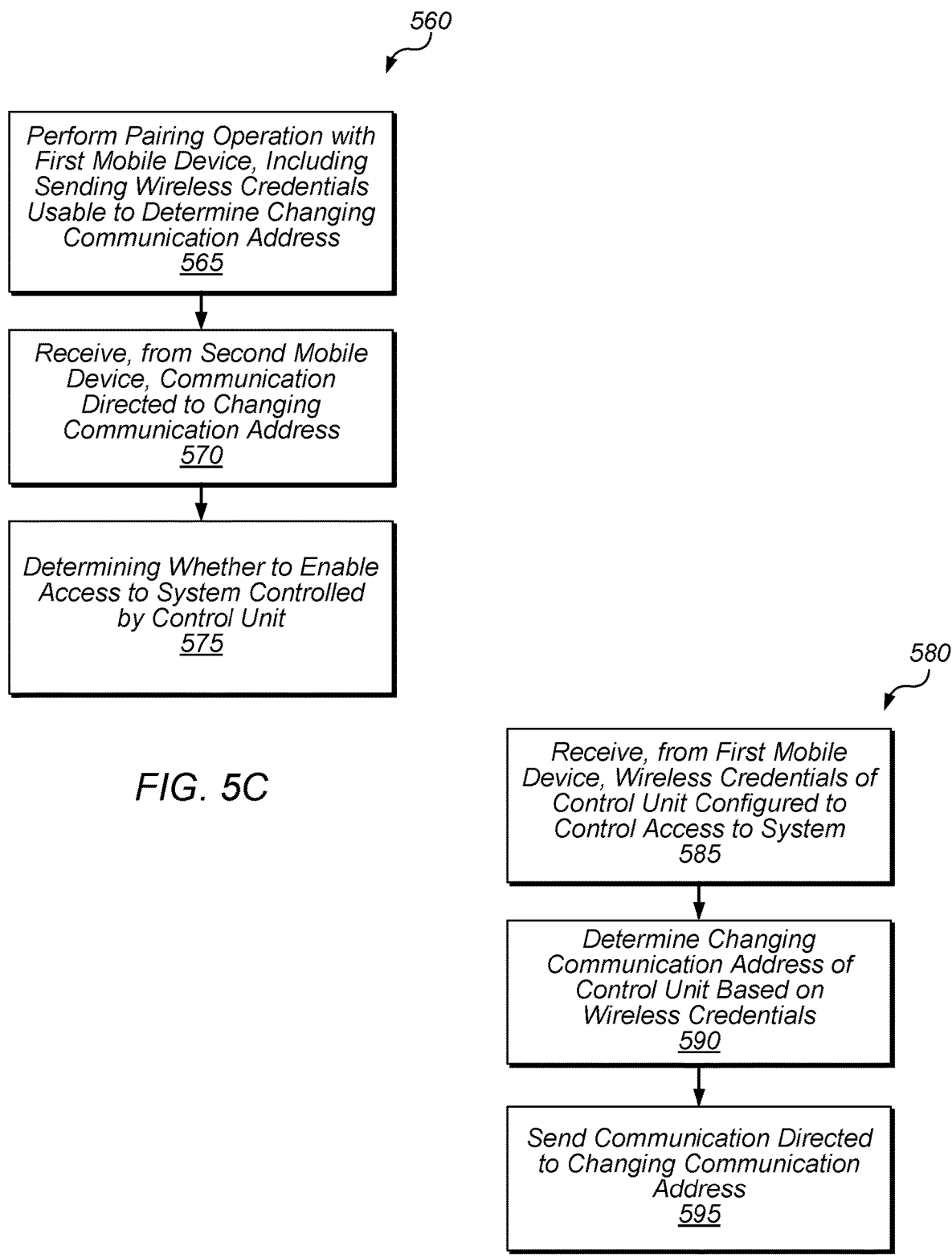

Turning now to FIG. 5C, a flow diagram of a method 560 for sharing access is depicted. Method 560 is one embodiment of a method performed by a control unit of a system being accessed such as control unit 137.

Method 560 begins in step 565 with the control unit performing a pairing operation with a first mobile device (e.g., mobile device 130A), the pairing operation including the control unit sending, to the first mobile device, wireless credentials (e.g., system wireless credentials 147) usable by the first mobile device to determine a changing communication address of the control unit. In various embodiments, the first mobile device is configured to share the wireless credentials with a second mobile device. In step 570, the control unit receives, from the second mobile device, a communication directed to the changing communication address (e.g., communications 150 and/or 155), the communication being indicative of a request to access a system controlled by the control unit. In step 575, in response to receiving the communication, the control unit determines whether to enable access to the system controlled by the control unit (e.g., for use in access communications at 306 or 406).

Turning now to FIG. 5D, a flow diagram of a method 580 for sharing access is depicted. Method 580 is one embodiment of a method performed by a mobile device, such as mobile device 130B, receiving access to a system.

Method 580 begins in step 585 with a second mobile device receiving, from a first mobile device (e.g., mobile device 130A), wireless credentials (e.g., credentials 147) of a control unit configured to control access to a system. In various embodiments, the first mobile device obtained the wireless credentials in a pairing operation with the control unit. In step 590, the second mobile device determines a changing communication address of the control unit based on the wireless credentials. In step 595, the second mobile device sends a communication (e.g., access communications at 306 or 406) directed to the changing communication address, the communication being indicative of a request to obtain access to the system controlled by the control unit.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A control unit, comprising:
a processor; and
memory having program instructions stored therein that are executable by the processor to cause the control unit to perform operations including:
performing a Bluetooth pairing operation with a first mobile device, wherein the Bluetooth pairing operation includes the control unit sending, to the first mobile device, wireless credentials usable by the first mobile device to determine a changing communication address of the control unit, and wherein the first mobile device is configured to share the wireless credentials with a second mobile device, and wherein the wireless credentials include a public media access control (MAC) address and identity resolving key (IRK) of the control unit;
establishing, with the second mobile device, a Bluetooth link, wherein the second mobile device is addressed by the control unit using an initial IRK of the second mobile device;
receiving, from the second mobile device over the Bluetooth link, a different IRK to be used for subsequent communications;
receiving, from the second mobile device, a communication directed to the changing communication address of the control unit, wherein the communication is indicative of a request from the second mobile device to access a system controlled by the control unit; and
in response to receiving the request, determining whether to enable the second mobile device to access to the system controlled by the control unit.

2. The control unit of claim 1, wherein the operations further include:
receiving, from the first mobile device, wireless credentials of the second mobile device that include the initial IRK; and
performing an authentication based on the wireless credentials of the second mobile device in order to establish the Bluetooth link with the second mobile device.

3. The control unit of claim 1, wherein the operations further include:
deriving a cryptographic key based on a sharing cryptographic key established with the first mobile device during the Bluetooth pairing operation; and
performing an authentication by decrypting at least a portion of the communication with the derived cryptographic key.

4. The control unit of claim 1, wherein the control unit is an electronic control unit (ECU) configured to enable physical entry into the system.

5. A non-transitory computer readable medium having program instructions stored therein that are executable by a second mobile device to perform operations comprising:
receiving, from a first mobile device, first wireless credentials of a control unit configured to control access to a system, wherein the first wireless credentials include a first public media access control (MAC) address and an identity resolving key (IRK) of the control unit, wherein the first mobile device obtained the first wireless credentials in a Bluetooth pairing operation with the control unit;
providing, to the first mobile device, second wireless credentials of the second mobile device, wherein the second wireless credentials include a second public media access control (MAC) address and an initial identity resolving key (IRK) of the second mobile device;
establishing a Bluetooth link with the control unit using the first and second wireless credentials, wherein the establishing includes determining a changing communication address of the control unit based on the first wireless credentials;
changing the initial IRK to a different IRK and communicating the different IRK to the control unit over the established Bluetooth link; and
sending, over the established Bluetooth link, a request to obtain access to the system controlled by the control unit.

6. The computer readable medium of claim 5, wherein the operations further comprising:
receiving, from the first mobile device, a second link cryptographic key derived from a sharing cryptographic key established between the first mobile device and the control unit during the Bluetooth pairing operation; and
encrypting the request with the second link cryptographic key.

7. The computer readable medium of claim 6, wherein the second link cryptographic key is generated by applying a key derivation function (KDF) to the sharing cryptographic key, a first link cryptographic key established during the Bluetooth pairing operation for communications between the first mobile device and the control unit, and a counter value, the counter value being indicative of a number of devices that have received authorization information for accessing the system.

8. The computer readable medium of claim 6, wherein the operations further comprise:
receiving, from the first mobile device, a beacon cryptographic key derived from the sharing cryptographic key; and
sending, to the control unit, a beacon including a payload encrypted with the beacon cryptographic key, wherein the encrypted payload is usable to authenticate the second mobile device to the control unit.

9. The computer readable medium of claim 8, wherein the beacon cryptographic key is generated by the first mobile device applying a key derivation function (KDF) to the sharing cryptographic key and a counter value, the counter value being indicative of a number of devices that have received authorization information for accessing the system.

10. The computer readable medium of claim 5, wherein the control unit is an electronic control unit (ECU) configured to unlock a door of the system.

11. A method, comprising:
receiving, at a second mobile device from a first mobile device, first wireless credentials of a control unit configured to control access to a system, wherein the first wireless credentials include a first public media access control (MAC) address and an identity resolving key (IRK) of the control unit, wherein the first mobile device obtained the first wireless credentials in a Bluetooth pairing operation with the control unit;
providing, by the second mobile device to the first mobile device, second wireless credentials of the second mobile device, wherein the second wireless credentials include a second public media access control (MAC) address and an initial identity resolving key (IRK) of the second mobile device;

establishing, by the second mobile device, a Bluetooth link with the control unit using the first and second wireless credentials, wherein the establishing includes determining a changing communication address of the control unit based on the first wireless credentials;

changing, by the second mobile device, the initial IRK to a different IRK and communicating the different IRK to the control unit over the established Bluetooth link; and sending, by the second mobile device over the established Bluetooth link, a request to obtain access to the system controlled by the control unit.

12. The method of claim 11, further comprising:

receiving, at the second mobile device from the first mobile device, a beacon cryptographic key derived from a sharing cryptographic key established between the first mobile device and the control unit.

13. The method of claim 12, wherein the beacon cryptographic key is generated by the first mobile device applying a key derivation function (KDF) to the sharing cryptographic key and a counter value, the counter value being indicative of a number of devices that have received authorization information for accessing the system.

14. The method of claim 12, wherein the establishing includes:

sending, to the control unit, a beacon including a payload encrypted with the beacon cryptographic key.

15. The method of claim 14, further comprising:

receiving, at the second mobile device from the first mobile device, a second link cryptographic key derived from the sharing cryptographic key; and using, by the second mobile device, the second link cryptographic key to encrypt traffic directed to the control unit after being authenticated.

16. The method of claim 15, wherein the second link cryptographic key is generated by applying a key derivation function (KDF) to the sharing cryptographic key, a first link key established during the Bluetooth pairing operation, and a counter value, the counter value being indicative of a number of devices that have received authorization information for accessing the system.

17. The method of claim 11, wherein the control unit is an electronic control unit (ECU) configured to operate an entry mechanism of the system.

18. The method of claim 12, wherein the sharing cryptographic key is established by a Diffie-Hellman exchange between the first mobile device and the control unit.

* * * * *